US012072659B2

(12) United States Patent
Kitajima

(10) Patent No.: US 12,072,659 B2
(45) Date of Patent: Aug. 27, 2024

(54) IMAGE FORMING SYSTEM

(71) Applicant: CANON KABUSHIKI KAISHA, Tokyo (JP)

(72) Inventor: Kenichiro Kitajima, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/225,938

(22) Filed: Jul. 25, 2023

(65) Prior Publication Data

US 2024/0027948 A1 Jan. 25, 2024

Related U.S. Application Data

(62) Division of application No. 17/901,319, filed on Sep. 1, 2022, now Pat. No. 11,762,321.

(30) Foreign Application Priority Data

Sep. 2, 2021 (JP) ................................ 2021-143044
Jul. 12, 2022 (JP) ................................ 2022-111491

(51) Int. Cl.
*G03G 15/20* (2006.01)
*G03G 15/00* (2006.01)

(52) U.S. Cl.
CPC ................................ *G03G 15/6585* (2013.01)

(58) Field of Classification Search
CPC ..... G03G 15/6585; G03G 2215/00801; G03G 2215/00805; G06K 15/188
USPC ................................................ 399/341, 342
See application file for complete search history.

(56) References Cited

U.S. PATENT DOCUMENTS

| | | | | |
|---|---|---|---|---|
| 9,959,492 B2 | 5/2018 | Saito | | |
| 2012/0051815 A1* | 3/2012 | Satomi | G03G 15/234 399/341 | |
| 2013/0064588 A1* | 3/2013 | Akita | G03G 15/6585 399/341 | |
| 2015/0331379 A1* | 11/2015 | Bodinger | B41J 11/009 399/342 | |
| 2017/0269517 A1 | 9/2017 | Ikeda | | |
| 2018/0268269 A1 | 9/2018 | Sagimori et al. | | |

FOREIGN PATENT DOCUMENTS

JP 2016-224111 A 12/2016

* cited by examiner

*Primary Examiner* — Hoang X Ngo
(74) *Attorney, Agent, or Firm* — Venable LLP

(57) ABSTRACT

An image forming system includes an image forming unit, a varnish applying unit, a control unit that executes an operation in an image forming mode in which a toner image is formed on a recording material and a varnish image is formed on the recording material on which the toner image is formed, and an input unit that permits input of a line width adjusting value of either one of a line width of a portion of the varnish image overlapping with an image portion and a line width of a portion of the varnish image overlapping with a non-image portion, wherein the varnish image is formed so as to extend over an image portion where the toner image is formed on the recording material and a non-image portion where the toner image is not formed on the recording material.

24 Claims, 14 Drawing Sheets

| IMG FILE NO. | PAPER KIND | | | VARNISH COATING SET VALUE | | | | | | | |
|---|---|---|---|---|---|---|---|---|---|---|---|
| | | | | VRNSH IMAGE | VRNSH KIND | L.W. ADJUSTING VALUE | | | F.T. ADJUSTING VALUE | | |
| | KIND | B.W. | BRAND | | | INTL Ws | SLD $\Delta Xb$ | W.B.P. $\Delta Xw$ | INTL Ds | ADJST $\Delta Xd$ | ADJST $\Delta Xv$ |
| 1 | COAT 1 | 106 – 128 | A | — | — | 0 | 0 | 0 | 0 | 0 | 0 |
| 2 | COAT 2 | 129 – 150 | A | ON | M | 0 | + | 0 | 5 μm | 0 | 0 |
| 3 | COAT 2 | 129 – 150 | B | ON | M | 0 | +2 | −2 | 10 μm | +5 | +5 |
| 4 | COAT 2 | 129 – 150 | C | ON | M | 0 | +2 | +1 | 10 μm | +5 | +5 |
| 5 | RESIN 1 | 106 – 160 | D | ON | M | 0 | −2 | 0 | 20 μm | −5 | −5 |
| * | * | * | * | | | | | | | | |

Fig. 4

IMAGE FORMING SYSTEM

FIELD OF THE INVENTION AND RELATED ART

The present invention relates to an image forming system including an image forming apparatus for forming a toner image on a recording material, and a varnish applying apparatus capable of overprinting a fixing formed, with varnish, on the toner image formed on the recording material.

Recently, for the purpose of improving glossiness, water resistance, and friction (wear) resistance, of the toner image separately from the toner image, a varnish image using colorless and transparent varnish is overprinted superposedly on the toner image. As an apparatus capable of forming the varnish image, for example, a varnish applying apparatus of an ink jet type (called a varnish coater) is used. The varnish coater ejects varnish partially on the recording material (so-called spot coating) and thus is capable of forming a varnish image desired by a user (Japanese Laid-Open Patent Application No. 2016-224111).

However, in the apparatus disclosed in JP-A 2016-224111, in the case where the varnish image is formed so as to extend over the toner image and a white background portion, a difference in line width of the varnish image is caused to occur between the toner image and the white background portion, so that appearance of the varnish image changed between the toner image and the white background portion as a boundary in some instances.

SUMMARY OF THE INVENTION

In view of the above-described problem, a principal object of the present invention is to provide an image forming system capable of suppressing occurrence of a difference in line width of a varnish image between a toner image and a white background portion as a boundary in the case where the varnish image is formed so as to extend over the toner image and the white background portion.

According to an aspect of the present invention, there is provided an image forming system comprising an image forming unit configured to form a toner image on a recording material; a varnish applying unit configured to form a varnish image by ejecting varnish to the recording material; a control unit configured to execute an operation in an image forming mode in which a toner image is formed on the recording material by the image forming unit and a varnish image is formed on the recording material, on which the toner image is formed, by the varnish applying unit; and an input unit configured to permit input of a line width adjusting value of either one of a line width of a portion of the varnish image overlapping with an image portion and a line width of a portion of the varnish image overlapping with a non-image portion, wherein the varnish image is formed so as to extend over the image portion where the toner image is formed on the recording material and the non-image portion where the toner image is not formed on the recording material.

Further features of the present invention will become apparent from the following description of exemplary embodiments with reference to the attached drawings.

BRIEF DESCRIPTION OF THE DRAWINGS

FIG. 4 is a varnish image setting table.

Figure 5:
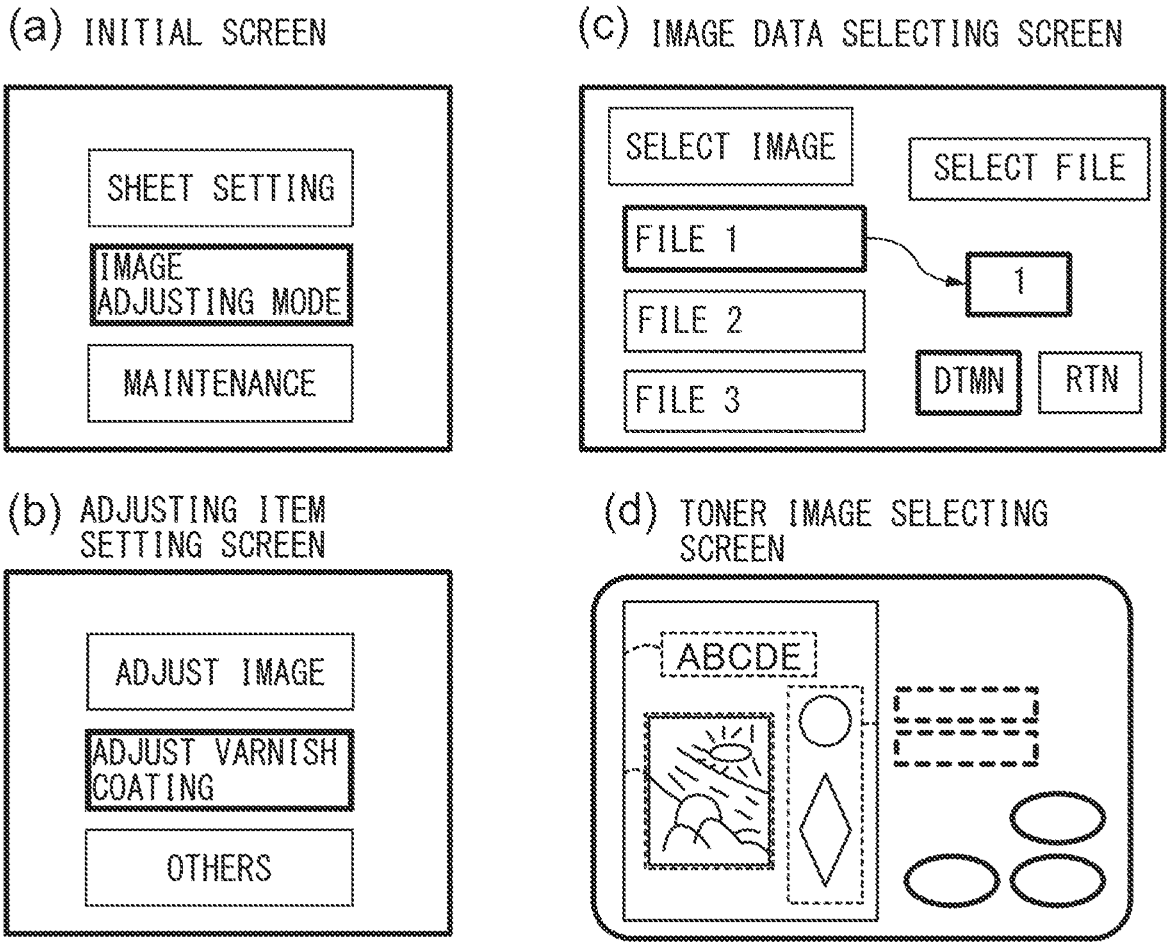

Parts (a) to (d) of FIG. 5 are schematic views each showing a varnish image adjusting screen in which part (a) is an initial screen, part (b) is an adjusting item setting screen, part (c) is an image data selecting screen, and part (d) is a toner image selecting screen.

Figure 6:
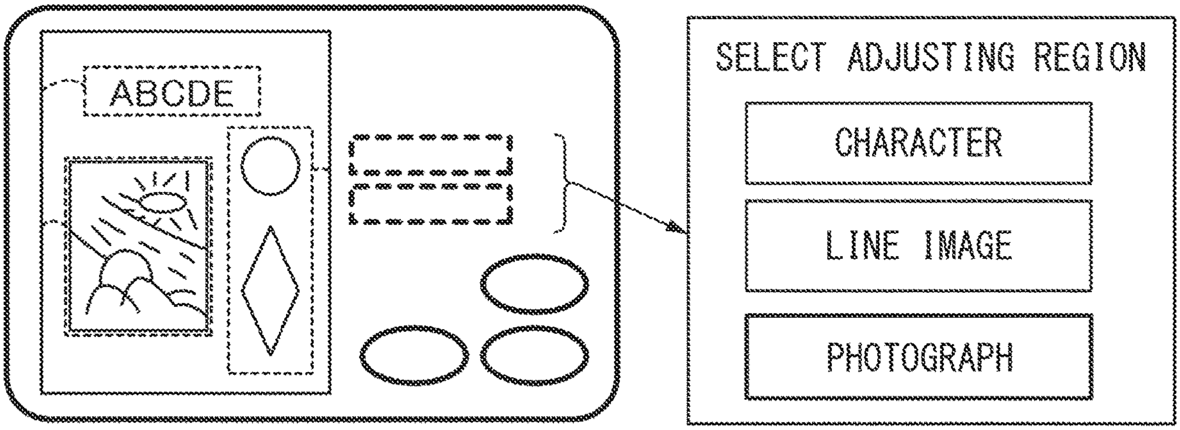

FIG. 6 is a schematic view showing adjusting region selecting buttons.

Figure 7:
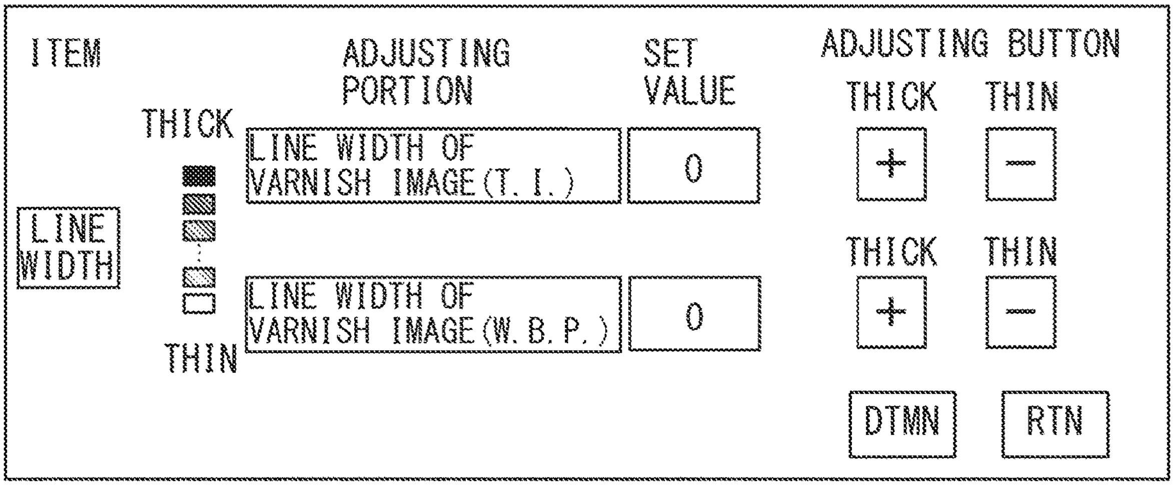

FIG. 7 is a schematic view showing a line width adjusting screen.

Figure 8:
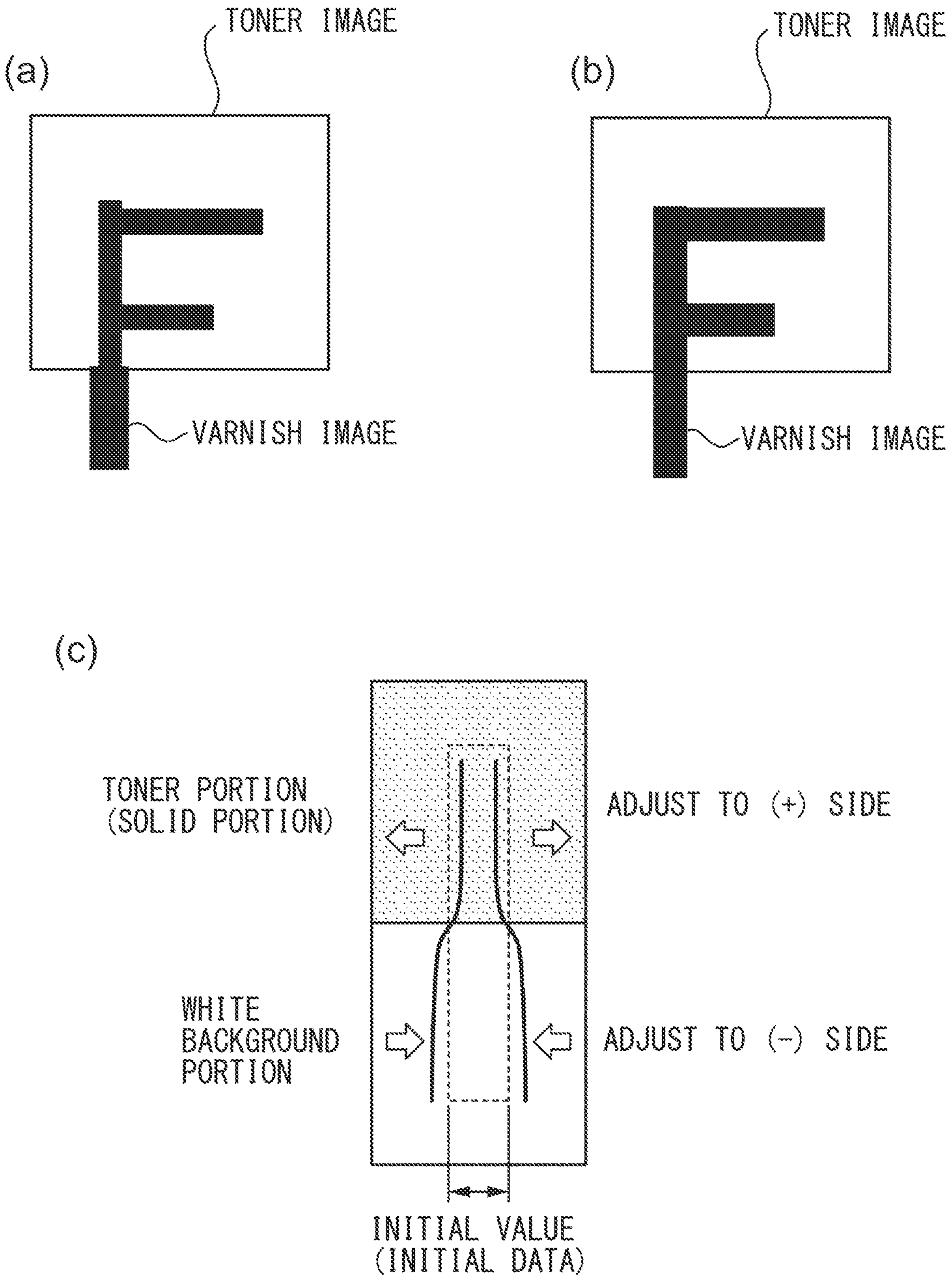

Part (a) of FIG. 8 is a schematic view showing a varnish image before adjustment, part (b) of FIG. 8 is a schematic view showing the varnish image after the adjustment, and part (c) of FIG. 8 is a model diagram for illustrating line width adjustment of the varnish image on a toner image and on a white background portion.

Figure 9:
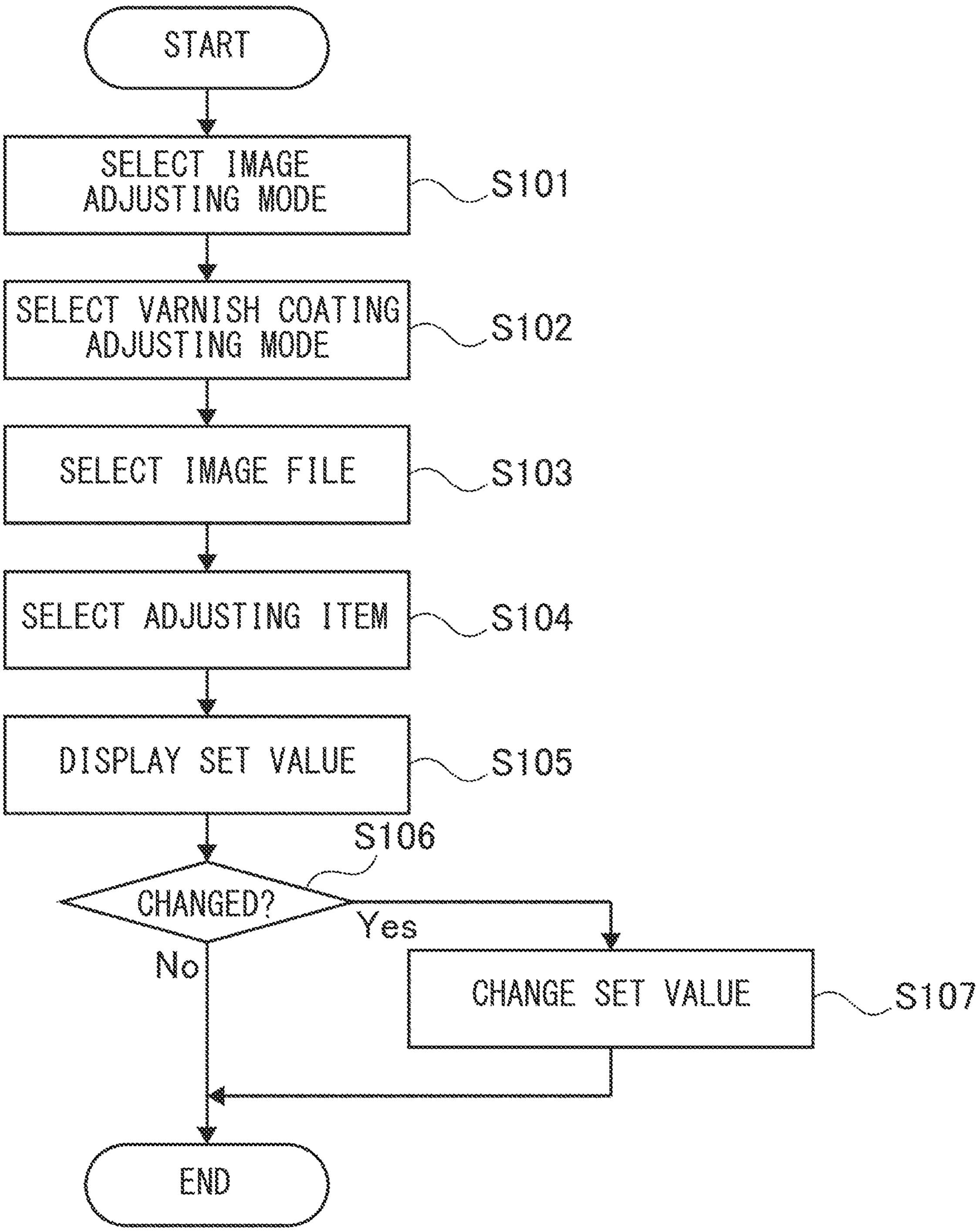

FIG. 9 is a flowchart showing varnish image adjusting processing.

Figure 10:
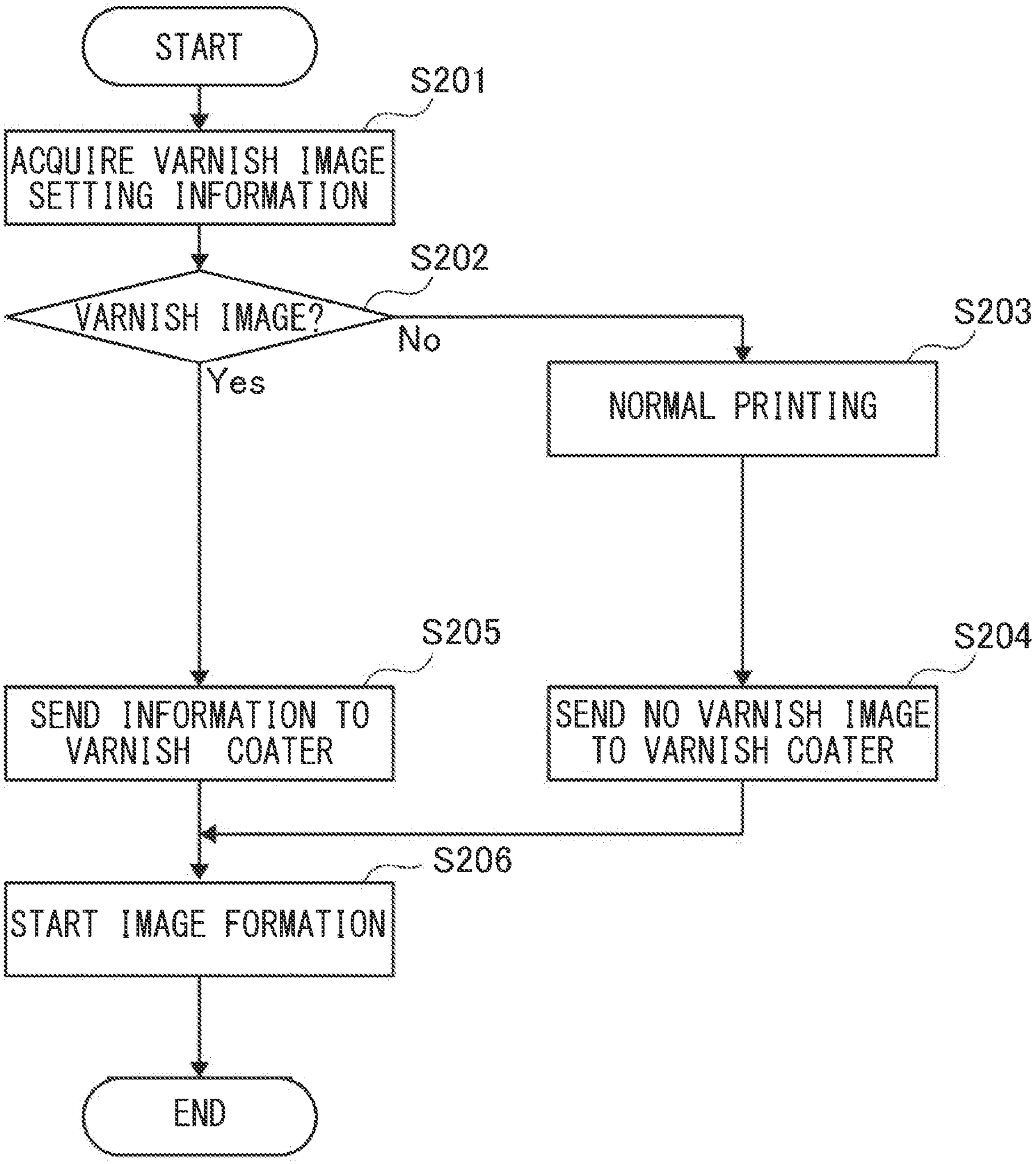

FIG. 10 is a flowchart showing varnish image preparing processing.

Figure 11:
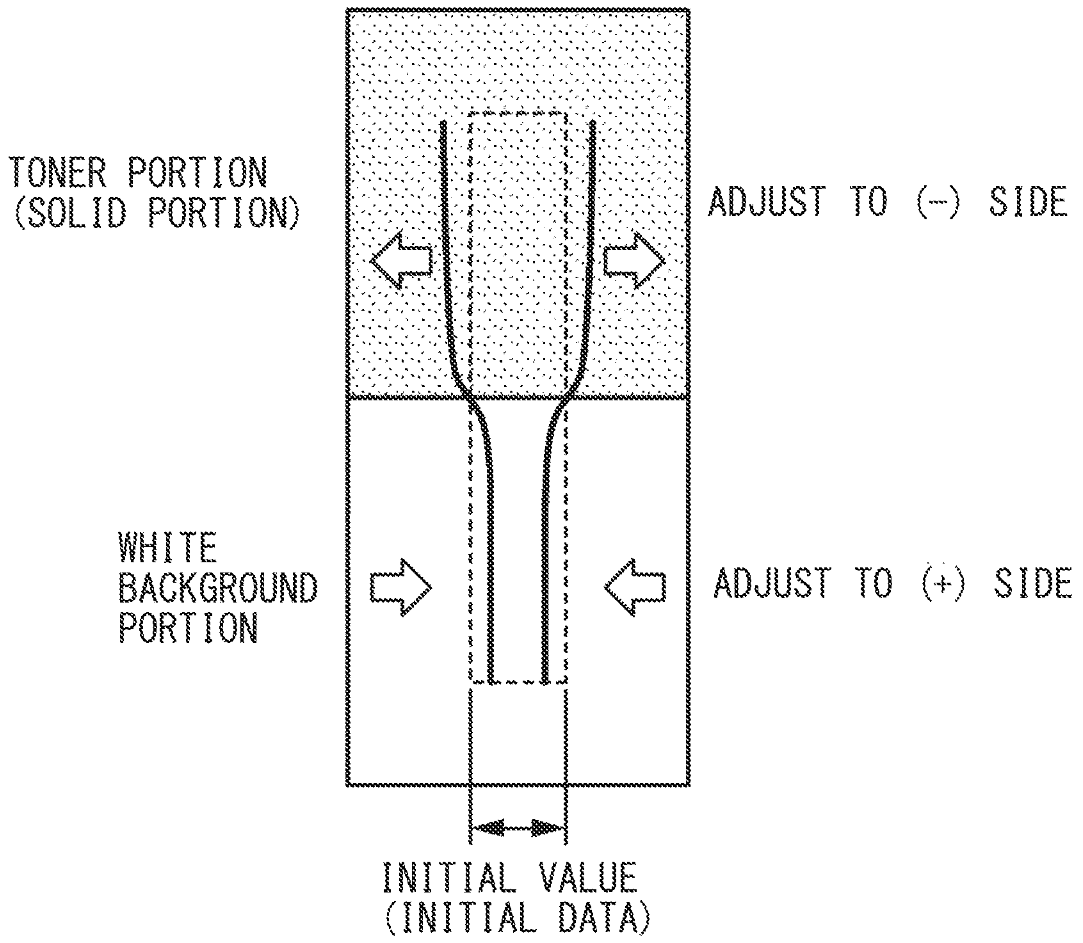

FIG. 11 is a model diagram for illustrating adjustment of a line width and a film thickness.

Figure 12:
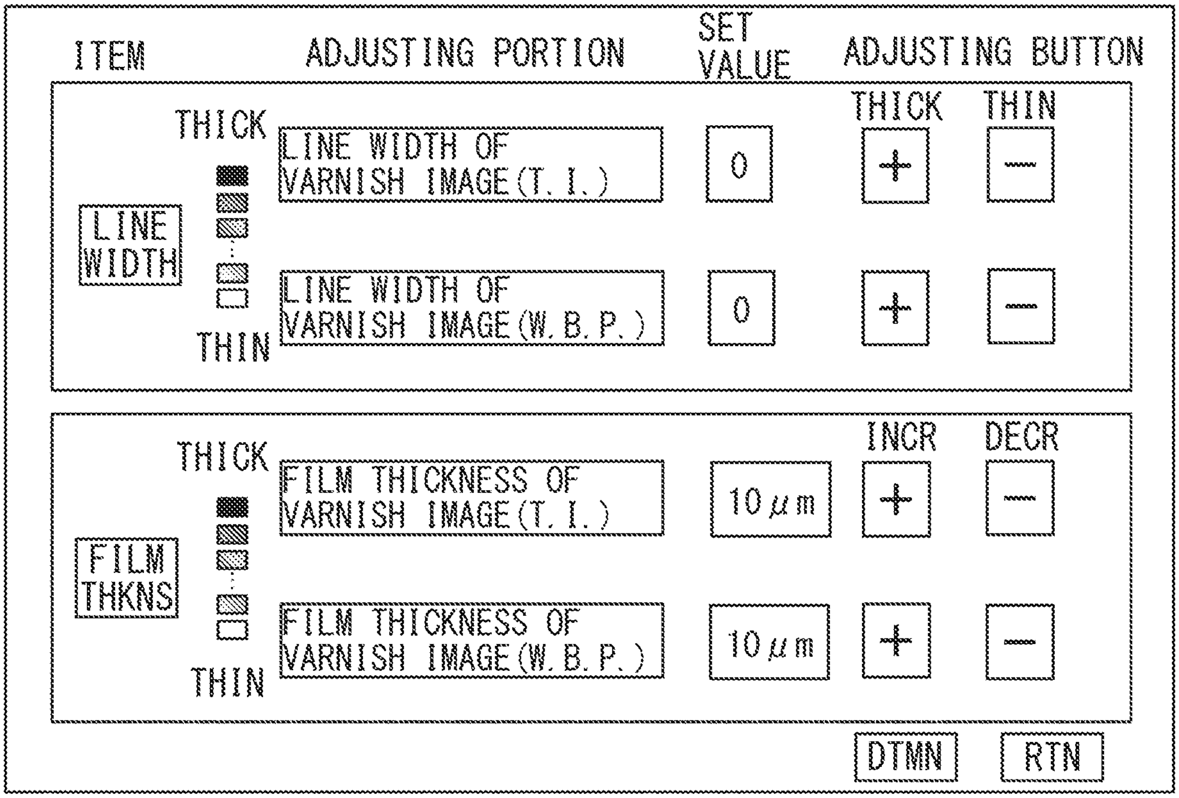

FIG. 12 is a schematic view showing an adjusting screen of the line width and the film thickness.

Figure 13:
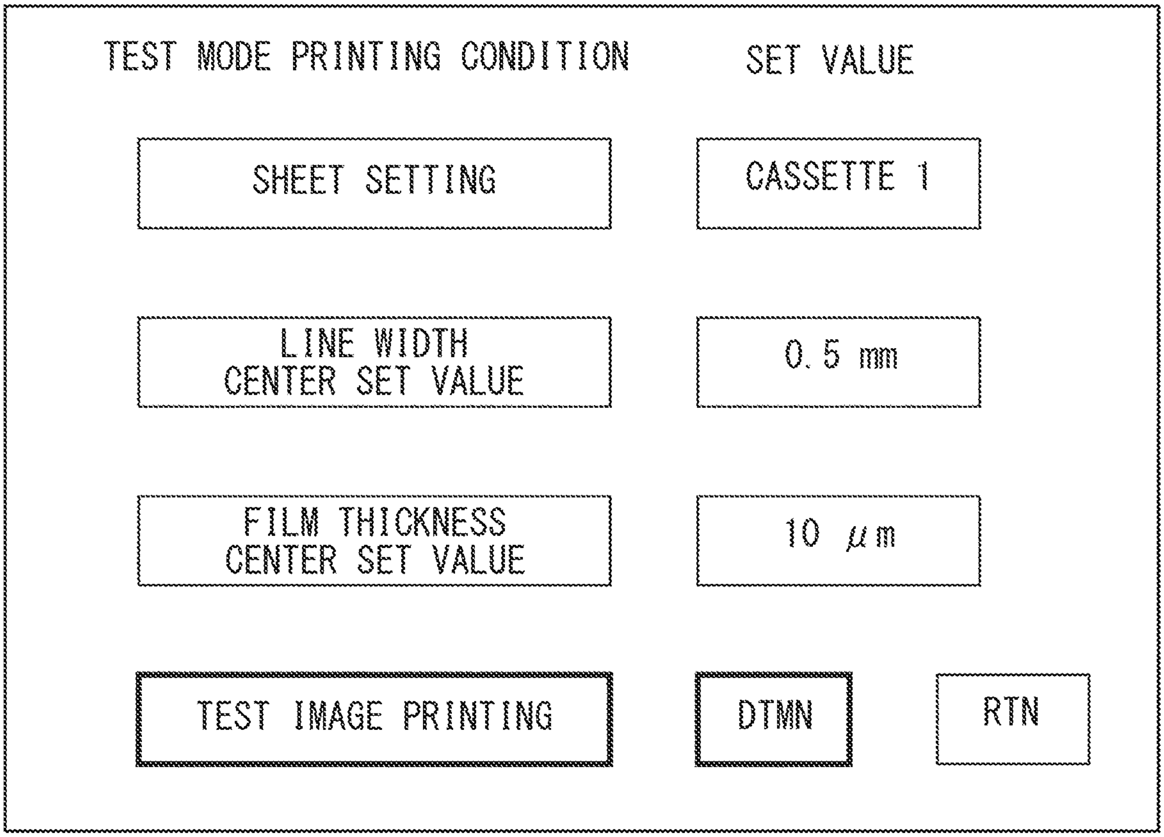

FIG. 13 is a schematic view showing a test mode screen.

Figure 14:
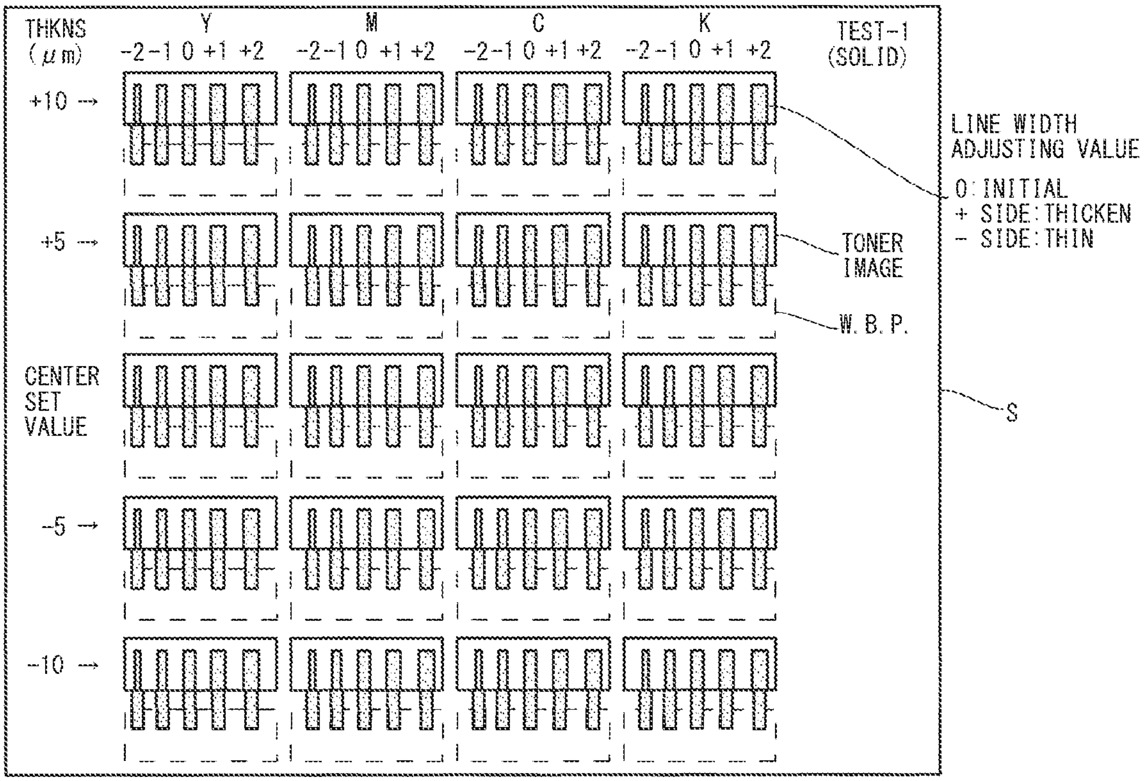

FIG. 14 is a test chart in which the varnish image formed on the toner image is adjusted.

Figure 15:
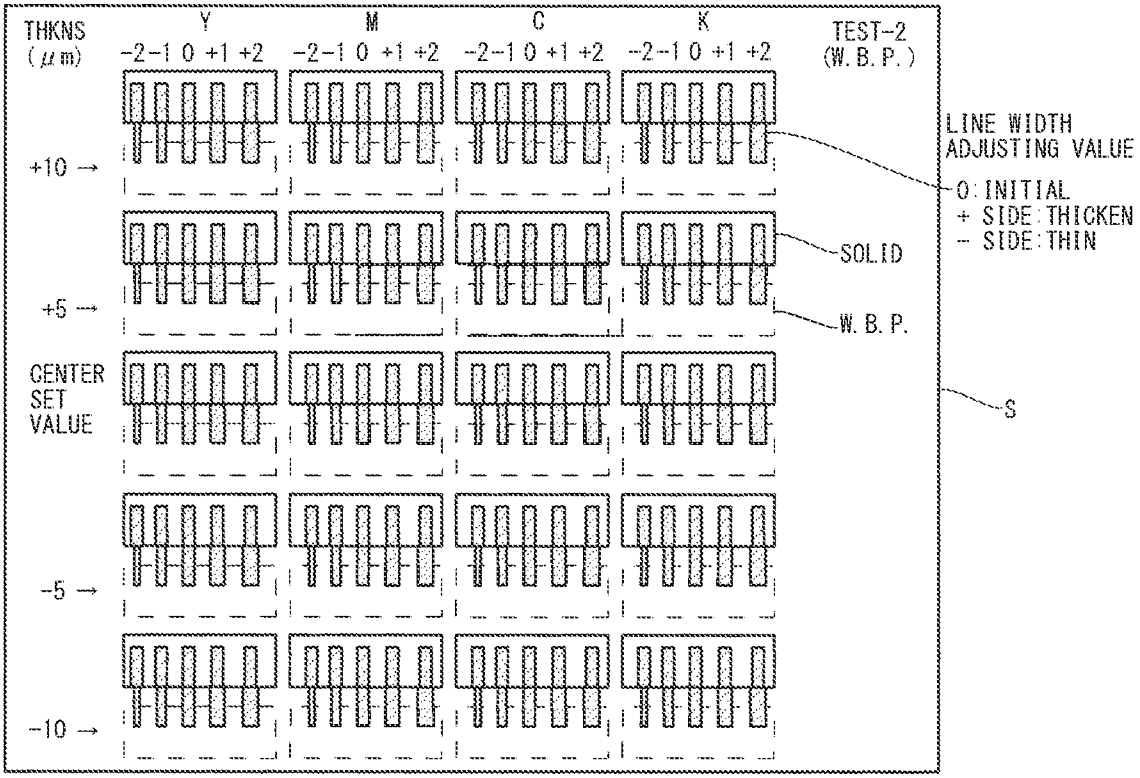

FIG. 15 is a test chart in which the varnish image formed on the white background portion is adjusted.

DESCRIPTION OF THE EMBODIMENTS

First Embodiment

Figure 1:
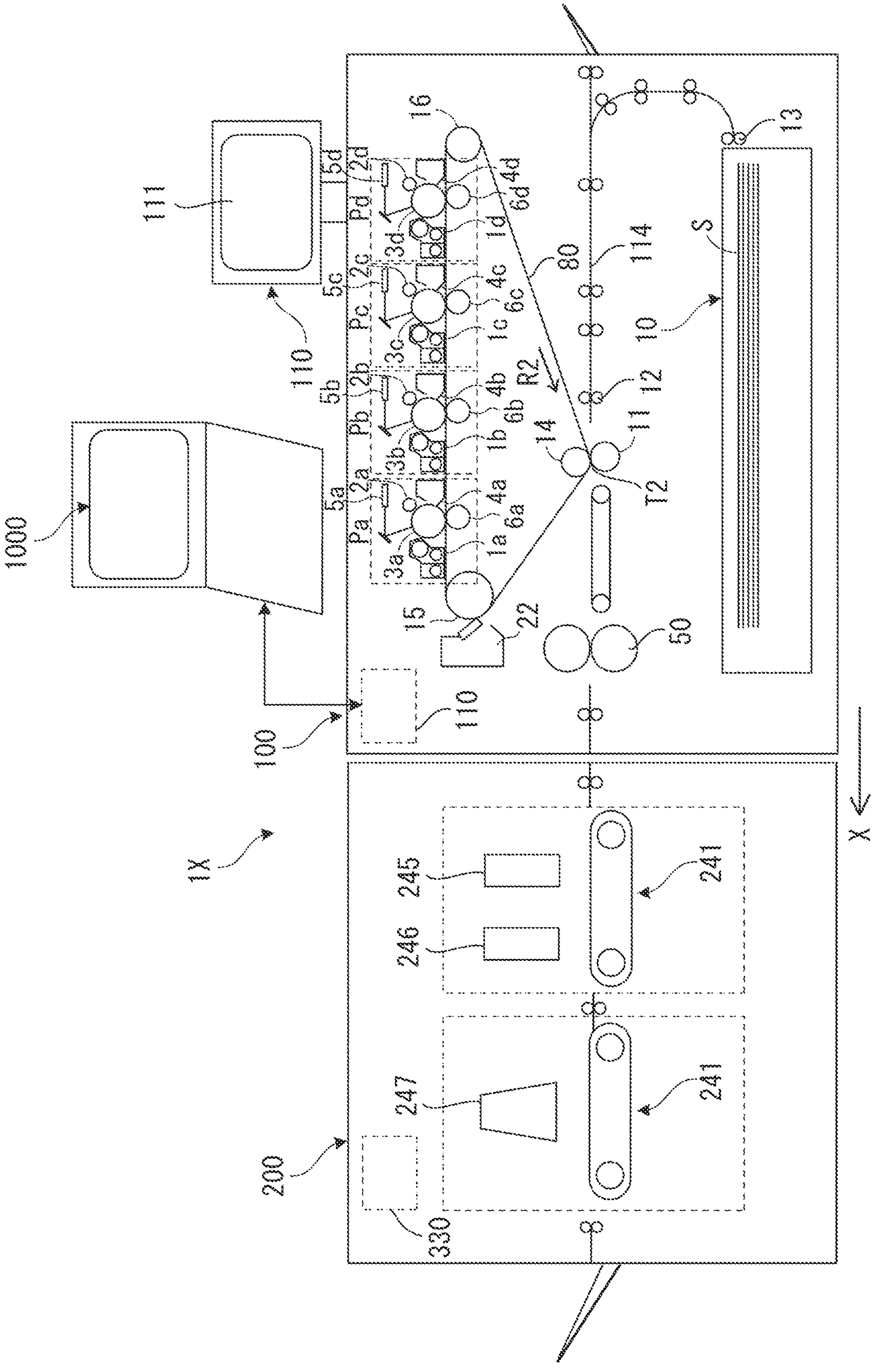
FIG. 1 is a schematic view showing a structure of an image forming system.

First, an image forming system 1X of this embodiment will be described using FIG. 1. The image forming system 1X shown in FIG. 1 includes an image forming apparatus 100 for forming a toner image on a recording material S and a varnish applying apparatus (referred to as a varnish coater) 200 for forming a varnish image on the recording material S. The varnish coater 200 is a post-step unit retrofittable to the image forming apparatus 100 for expanding function, and the image forming apparatus 100 and the varnish coater 200 are connected to each other so as to be capable of delivering the recording material S therebetween. The image forming apparatus 100 and the varnish coater 200 are connected to each other by input/output interfaces (not shown) so as to be capable of sending and receiving control signals and data therebetween. The recording material S on which the toner image is formed by the image forming apparatus 100 is conveyed toward the varnish coater 200 for the purpose of improving glossiness, water resistance, friction resistance, and the like of the toner image formed on the recording material S, so that the varnish image is formed on the recording material S separately from the toner image by the varnish coater 200. Formation of the varnish image by the varnish coater 200 will be described later.

Incidentally, although illustration is omitted, the image forming system 1X may include another post-step unit, such as a relay apparatus, a finisher apparatus, or the like. The relay apparatus is disposed between the image forming apparatus 100 and the varnish coater 200, and reverses and sends the recording material S, conveyed from the image forming apparatus 100, to the varnish coater 200 or sends the recording material S to the varnish coater 200 after temporarily stacking the recording material S. The finisher apparatus performs, for example, punching such that the recording material S is perforated or stapling such that a plurality of recording materials S are bundled and stapled, and then the perforated recording material S or the bundle of the stapled recording materials S is discharged. Further, in addition to these post-step units, for example, the image forming system 1X may include a recording material supplying apparatus (not shown) capable of accommodating recording materials S therein in a large amount, in which the recording material S may be supplied from the recording material supplying apparatus to the image forming apparatus 100.

<Image Forming Apparatus>

The image forming apparatus 100 will be described. The image forming apparatus 100 is an electrophotographic full-color printer of a tandem type. The image forming apparatus 100 includes image forming portions Pa, Pb, Pc, and Pd for forming images of yellow, magenta, cyan, and black, respectively. The image forming apparatus 100 forms a toner image on the recording material S on the basis of data relating to the toner image included in image data sent from an original reading device (not shown) connected to, for example, the image forming apparatus 100 or from an external device 1000 such as a personal computer connected to the image forming apparatus 100. As the recording material S, it is possible to cite sheet materials, such as plain paper, thick paper, roughened paper, uneven paper and coated paper.

A feeding process of the recording material S in the image forming apparatus 100 will be described. The recording materials S are accommodated is a cassette 10 in a stacked form, and are sent from the cassette 10 in synchronism with an image forming timing by a supplying roller 13. The recording material S sent by the supplying roller 13 is conveyed toward a registration roller pair 12 provided in the course of a feeding (conveying) passage 114. Then, the recording material S is subjected to oblique movement correction or timing correction by the registration roller pair 12, and thereafter, is sent to a secondary transfer portion T2. The secondary transfer portion T2 is a transfer nip formed by an inner secondary transfer roller 14 and an outer secondary transfer roller 11, and the toner image is transferred onto the recording material S in response to application of a secondary transfer voltage to the outer secondary transfer roller 11.

As regards the recording material S feeding process until the above-described secondary transfer portion T2, an image forming process of the image sent to the secondary transfer portion T2 at a similar timing will be described. First, although the image forming portions will be described, the respective color image forming portions Pa, Pb, Pc and Pd are constituted substantially similar to each other except that colors of toners used in developing devices 1*a*, 1*b*, 1*c* and 1*d* are yellow (Y), magenta (M), cyan (C), and black (K), respectively, which are different from each other. Thereafter, in the following, as a representative example, the image forming portion Pd for black will be described, and other image forming portions Pa, Pb and Pc will be omitted from description.

The image forming portions Pd is principally constituted by the developing device 1*d*, a charging device 2*d*, a photosensitive drum 3*d*, a photosensitive drum cleaner 4*d*, an exposure device 5*d*, and the like. A surface of a rotating photosensitive drum 3*d* is electrically charged uniformly in advance by the charging device 2*d*, and thereafter, an electrostatic latent image is formed by the exposure device 5*d* driven on the basis of a signal of image information. Then, the electrostatic latent image formed on the photosensitive drum 3*d* is developed into a toner image with use of a developer by the developing device 1*d*. Then, the toner image formed on the photosensitive drum 3*d* is primary-transferred onto an intermediary transfer belt 80 in response to application of a primary transfer voltage to a primary transfer roller 6*d* disposed opposed to the image forming portion Pd while sandwiching the intermediary transfer belt 80 therebetween. Primary transfer residual toner slightly remaining on the photosensitive drum 3*d* is collected to the photosensitive drum cleaner 4*d*.

The intermediary transfer belt 80 is stretched by the inner secondary transfer roller 14, and stretching rollers 15 and 16, and is driven in an arrow R2 direction. In the case of this embodiment, the stretching roller 16 also functions as a driving roller for driving the intermediary transfer belt 80. The respective color image forming processes are carried out at timings when the associated toner image is superposedly transferred onto the upstream toner image primarily transferred onto the intermediary transfer belt 80. As a result, finally, a full-color toner image is formed on the intermediary transfer belt 80 and is conveyed to the secondary transfer portion T2. Incidentally, secondary transfer residual toner after passing through the secondary transfer portion T2 is removed from the intermediary transfer belt 80 by a transfer cleaner 22.

In the above, by the above-described feeding process and the above-described image forming process, in the secondary transfer portion T2, the timing of the recording material S and the timing of the full-color toner image coincide with each other, so that secondary transfer is carried out. Thereafter, the recording material S is conveyed to a fixing device 50, in which heat and pressure are applied to the recording material S, so that the toner image is fixed on the recording material S. The fixing device 50 nips and feeds the recording material S on which the toner image is formed, and applies heat and pressure to the fed recording material S, so that the fixing device 50 fixes the toner image on the recording material S. That is, the toner of the toner image formed on the recording material S is melted and mixed, and is fixed as the full-color image on the recording material S. Thus, a series of the image forming processes is ended. Then, in the case of this embodiment, the recording material S on which the toner image is fixed is conveyed from the image forming apparatus 100 to the varnish coater 200.

In this embodiment, a two-component developer containing the toner and a carrier is used. The toner contains a binder resin, a colorant, and a parting agent (wax). As the binder resin, a known binder resin can be used. For example, it is possible to use resin materials such as a vinyl copolymer represented by a styrene-(meth)acrylic copolymer, a polyester resin, a hybrid resin obtained by chemically bonding a vinyl copolymer unit and a polyester unit to each other, an epoxy resin, a styrene-butadiene copolymer, and the like. As the colorant, it is possible to use known colorants for yellow, magenta, cyan, and black, respectively.

As the parting agent, for example, it is possible to cite aliphatic hydrocarbon waxes such as low-molecular weight polyethylene, low-molecular weight olefin copolymer wax, microcrystallin wax, Fischer-Tropsch wax, and paraffin wax; oxide of the aliphatic hydrocarbon wax such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

In the case of this embodiment, in the image data, data relating to the varnish image formed by the varnish coater 200 is also contained. That is, the data (second image data) relating to the varnish image is set separately from data (first image data) relating to the toner images of the four colors YMCK. Herein, the data relating to the varnish image included in the image data is referred to as an "initial data". In the initial data, similar to the data relating to the toner images of the four colors of YMCK, for each of pages, an individual varnish image is associated with a coordinate of an image forming region on the recording material S.

Figure 2:
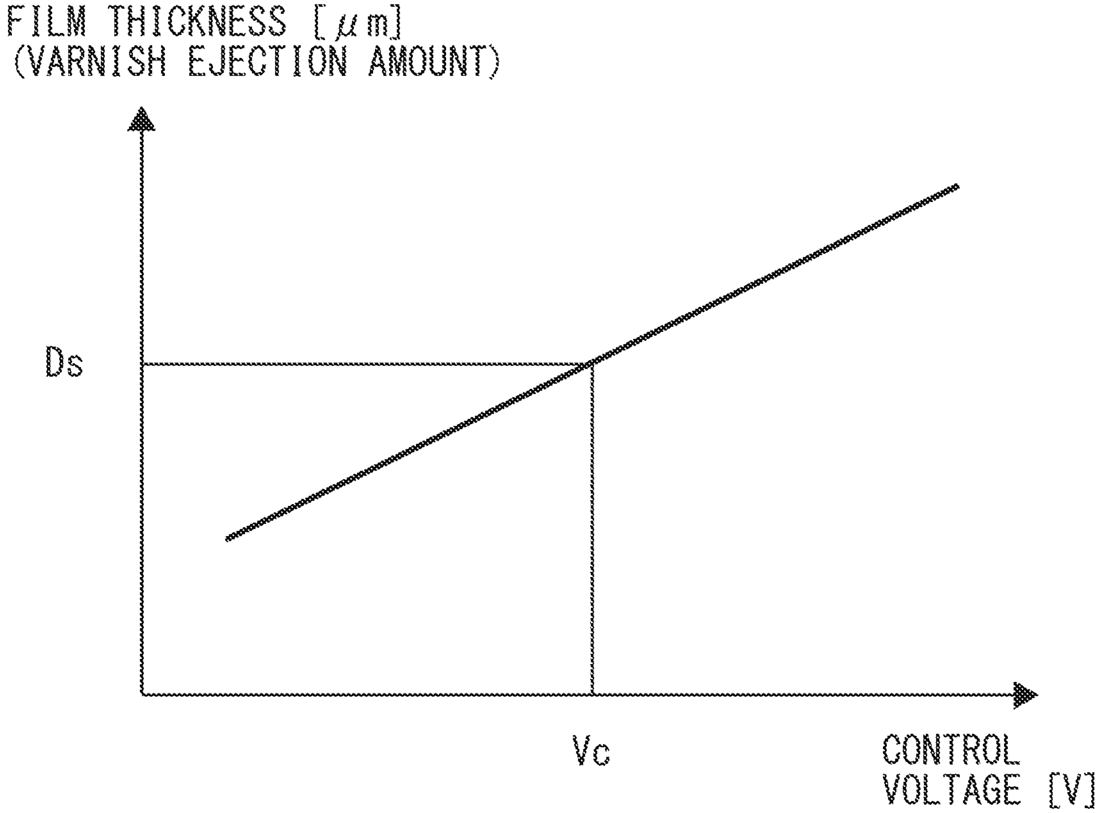
FIG. 2 is a graph showing showing a relationship between a control voltage and a film thickness which relate to varnish image formation.

Next, the varnish coater 200 will be described using FIGS. 1 and 2. The varnish coater 200 is a varnish applying apparatus of an ink jet type capable of forming varnish images such as characters, diagrams, graphics, and the like, which are desired by users. In the case of the ink jet type, varnish in the form of droplets is ejected toward the recording material S, so that the varnish is deposited on the recording material S and thus the varnish image is formed. The varnish coater 200 is capable of forming the varnish image on the basis of data relating to the varnish image. Incidentally, in the following, the varnish coater 200 for forming the varnish image with use of a colorless and transparent varnish liquid (so-called ultraviolet (UV)-curable UV varnish) solidified by UV irradiation will be described as an example.

The varnish coater 200 includes a sheet feeding portion 241, a position detecting portion 245, a varnish ejecting portion 246, and a varnish solidifying portion 247. The sheet feeding portion 241 feeds the recording material S while attracting the recording material S to a belt feeding surface by an air sucking device (not shown) through holes formed in a feeding belt 242. Along a sheet feeding passage of this sheet feeding portion 241, in an order from an upstream side toward a downstream side of a feeding direction (arrow X direction) of the recording material S, the position detecting portion 245, the varnish ejecting portion 246, and the varnish solidifying portion 247 are disposed. The position detecting portion 245 is a detecting portion using a CCD, or the like, for example, and with respect to the recording material S fed while being sucked on the belt feeding surface, the position detecting portion 245 detects each of a position of a leading end of the recording material S with respect to the feeding direction, a position of each of opposing end portions with respect to a widthwise direction, and a position of the toner image on the recording material S. The position of the toner image is detected by the position detecting portion 245, so that the varnish coater 200 is capable of overprinting the varnish image superposedly on the toner image.

The varnish ejecting portion 246 forms the varnish image on the recording material S by ejecting the varnish onto one surface (side) of the recording material S fed by the sheet feeding portion 241. The varnish ejecting portion 246 includes a plurality of print heads (not shown). The print heads are, for example, heads of a line type, in which a plurality of ejection ports (not shown) are arranged and disposed in the widthwise direction crossing the feeding direction of the recording material S. A varnish ejecting method of the print heads may employ a type using heat generating elements, a type using piezo electric elements, a type using electrostatic elements, a type using MEMS elements, and the like. Although illustration is omitted, the varnish is supplied from a tank to the associated one of the print heads through a tube.

A film thickness of the varnish image is influenced by an application amount per unit area of the varnish onto the recording material S. The varnish amount can be changed by adjusting a varnish ejecting amount from the print heads. For example, in the case of the type using the piezoelectric elements, as shown in FIG. 2, the varnish ejection amount varies depending on adjustment of a control voltage, and the film thickness of the varnish image is adjusted depending on an increase and a decrease in varnish ejection amount per unit area. In the case of this embodiment, the film thickness of the varnish image is adjusted in a range of, for example, "5-100 μm", preferably "10-70 μm". Further, a line width of the varnish image is adjusted depending on the number of ejection ports, of a plurality of ejection ports, used as the ejection portions through which the varnish is ejected. For example, adjustment is made so that the number of the ejection ports used as the ejection ports through which the varnish is ejected is increased in the case where the line width of the varnish image is made thick (wide) and is decreased in the case where the line width of the varnish image is made thin (narrow).

Further, a resolution of the varnish image capable of being formed by the varnish coater 200 is, for example, 600 dpi, and in that case, the line width of the varnish image is adjusted in a 600 dpi unit. Incidentally, the above-described range of the film thickness of the varnish image, the resolution of the varnish image, and an adjusting range of the line width of the varnish image may be appropriately changed depending on the varnish ejecting method of the print heads, a kind of the varnish, and the like.

Returning to FIG. 1, the recording material S on which the varnish image is formed on one surface thereof by the varnish ejecting portion 246 is sent by the sheet feeding portion 241 to the varnish solidifying portion 247 positioned downstream of the varnish ejecting portion 246 with respect to the feeding direction, and then the varnish on the recording material S is solidified by the varnish solidifying portion 247. The varnish solidifying portion 247 as the UV irradiation portion includes a UV lamp, and the UV lamp irradiates the varnish with UV light (rays) of a wavelength corresponding to the varnish. The UV lamp is disposed in an almost entire region of the recording material S with respect to the widthwise direction so as to be capable of emitting the UV light (UV radiation), and is turned on only during passing of the recording material S. As described above, the varnish image is capable of being overprinted superposedly on the toner image formed on the recording material S.

Incidentally, in this embodiment, the UV varnish is used as the varnish, but the present invention is not limited thereto, and if oil varnish or aqueous varnish is used, in order to solidify the varnish, it is desirable that an IR (infrared ray) lamp, not the UV lamp, be used. Further, the varnish may be solidified by warm air or by the IR lamp and the warm air in combination.

Next, a control constitution of an image formation control system in the image forming system 1X will be described using FIG. 3 while making reference to FIG. 1. In this embodiment, the image forming apparatus 100 (specifically, the main controller 101) unitarily manages and controls an operation instruction to the varnish coater 200. Incidentally, to a main controller 101 and a varnish processing controller 330 which are described later, in addition to the devices (portions) illustrated in FIG. 3, various devices such as motors and power sources are connected, but are not the main object of the present invention herein, and therefore, will be omitted from illustration and description.

Figure 3:
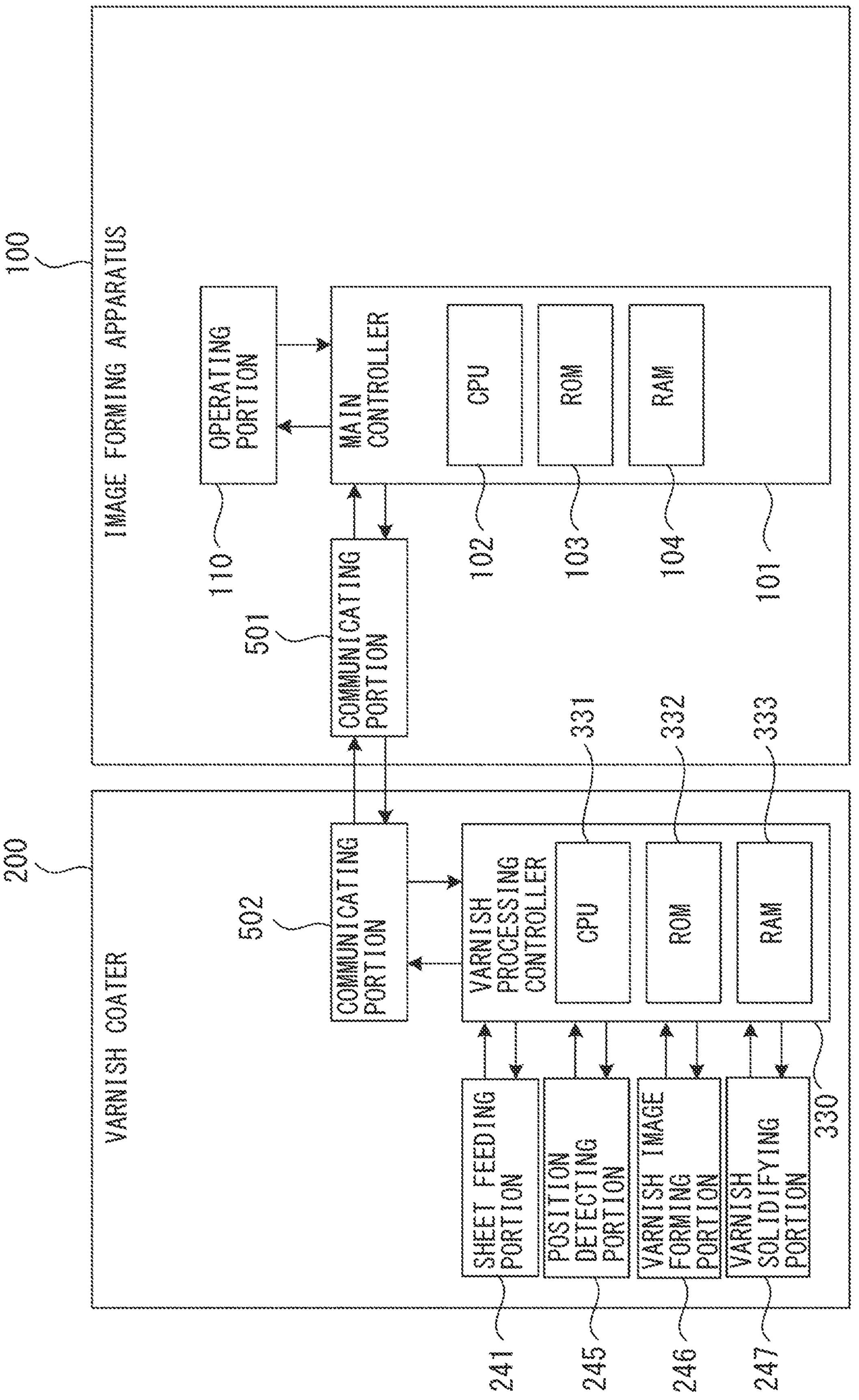
FIG. 3 is a control block diagram of an image formation control system in the image forming system.

In the image forming system 1X of this embodiment, as shown in FIG. 3, to the main controller 101 as a control unit, the varnish processing controller 330 is connected via communication cables portions 501 and 502 so as to be capable of communicating operation instructions and various data. In accordance with the operation instructions from the main controller 101, the varnish processing controller 330 causes the varnish coater 200 to operate. That is, while the main controller 101 controls the operation of the image forming apparatus 100, the main controller 101 is capable of controlling entirety of the image forming system 1X including the varnish coater 200 by sending the operation instructions and the various data to the varnish coater 200. In this case, the main controller 101 is capable of functioning as an acquiring means for acquiring the image data.

The above-described main controller 101 and the above-described varnish processing controller 330 may have the same constitution. For example, each of the controllers includes a CPU (central processing unit), a ROM (read only memory), and a RAM (random access memory).

The main controller 101 includes the CPU 102, the ROM 103, and the RAM 104. In the ROM 103, in addition to, for example, image forming processing (not shown), various programs and the like for "varnish image adjusting processing" (FIG. 9) and "varnish image preparing processing" (FIG. 10) (described later) are stored. In the RAM 104, for example, a "varnish image setting table" (FIG. 4) (described later), and various data such as test data relating to test toner images and test data relating to test varnish images, which are formed on a test chart (described later) are stored. Incidentally, the RAM 104 is capable of temporarily storing a calculation (computation) processing result or the like with execution of the various programs.

The image forming apparatus 100 includes an operating portion 110 including, for example, a liquid crystal display portion 111 (see. FIG. 1), and the operating portion 110 is connected to the main controller 101. The operating portion 110 as an input portion (setting portion, selecting portion) is, for example, a touch panel. On the liquid crystal display portion 111, various screens presenting the various programs and various data or the like can be displayed by the operating portion 110. Further, the operating portion 110 receives input of a start of the various programs and input of the various data, and the like, depending on a screen touch operation by a user. On the touch panel, a screen including various buttons, switches, and the like as software switches can be displayed.

The user is capable of inputting a start of various programs for an operation in an "image forming mode", and operation in "test chart output mode", and the like from the operating portion 110. In the case where the start of the operation in the "image forming mode" is inputted, the CPU 102 is capable of executing the image forming processing (program) stored in the ROM 103. In the case where the start of the operation in the "test chart output mode" is inputted, the CPU 102 is capable of executing the test chart output processing (program) stored in the ROM 103. With this execution, together with the image forming apparatus 100, the varnish coater is capable of being operated. The image forming apparatus 100 forms the toner image on the recording material S on the basis of data relating to the toner image, and the varnish coater 200 forms the varnish image on the recording material S on the basis of data relating to the varnish image.

On the operating portion 110, a line width adjusting screen (FIG. 6) (described later) and various screens for transition to the line width adjusting screen (parts (a) and (d) of FIG. 5) (described later) are displayed, and the user is capable of inputting data relating to "varnish image setting information through the operating portion 110. Incidentally, the user is capable of changing the line width and the film thickness of the varnish image, defined in the initial data, through the operating portion 110.

The varnish processing controller 330 includes a CPU 331, a ROM 332, and a RAM 333. The CPU 331 causes the sheet feeding portion 241, the position detecting portion 245, the varnish ejecting portion 246, and the varnish solidifying portion 247 of the varnish coater 200 to operate on the basis of a control program stored in the ROM 332. To the varnish processing controller 330, data relating the varnish image contained in the image data and the "varnish image setting information" are sent from the main controller 101, and the varnish processing controller 330 causes the RAM 333 to store these data. The varnish coater 200 executes the varnish applying processing for forming the varnish image on the recording material S, on the basis of the data relating to the varnish image but during execution of the operation in the image forming mode, the varnish image is formed on the basis of the initial data and the "varnish image setting information".

In FIG. 4, the "varnish image setting table" is shown. The "varnish image setting table" is stored in advance in the ROM 103 or the RAM 104 (see FIG. 3) as a storing portion. As shown in FIG. 4, in the "varnish image setting table", information (indicated as "PAPER KIND" in FIG. 4) relating to the recording material S, such as a kind, a basis weight, and a brand of the recording material S is set.

For each of kinds of the above-described recording materials S, the "varnish image setting information" (indicated as "VARNISH COAT SET VALUE" in FIG. 4) is set. The "varnish image setting information" includes the presence or absence of the varnish image, a varnish kind, a line width adjusting value of the varnish image, and a film thickness adjusting value of the varnish image. The film thickness adjusting value of the varnish image will be described later.

As regards the presence or absence of the varnish image, "-(absence)" is set in the case where the varnish image is not formed including the case where the data relating to the varnish image is not included in the image data, and "ON (presence)" is set in the case where the varnish image is formed. The varnish kind shows a kind of the varnish used for forming the varnish image. In this embodiment, the varnish is the UV varnish as described above.

As the line width adjusting value of the varnish image, a line width initial value (initial line width value) (Ws), a line width adjusting value (ΔXb) of a portion overlapping with the toner image, and a line width adjusting value (ΔXw) of a portion overlapping with the white background portion are stored. The line width initial value (Ws) is updated by a line width value of the varnish image defined in the initial data, and is set at "0" before update. In the case where the initial data does not include the initial data, the line width initial value (Ws) is kept at "0". Incidentally, in this embodiment, the white background portion refers to a non-image portion where the toner image is not formed on the recording material S, relative to an image portion where the toner image is formed on the recording material S.

The above-described line width adjusting values (ΔXb, ΔXw) are updated by an operation of a "line width adjusting screen" (see FIG. 7) (described later). The line width of the varnish image formed by the varnish coater 200 is determined by the following formulas 1 and 2.

$$\text{(Line width of portion overlapping with toner image)} = \text{(line width initial value}(Ws)) + \text{(line width adjusting value}(\Delta Xb)) \quad \text{formula 1}$$

$$\text{(Line width of portion overlapping with varnish image)} = \text{(line width initial value}(Ws)) + \text{(line width adjusting value}(\Delta Xw)) \quad \text{formula 2}$$

Next, setting of the above-described line width adjusting value (ΔXb) of the portion overlapping with the toner image and the above-described line width adjusting value (ΔXw) of the portion overlapping with the varnish image will be described using part (a) of FIG. 5 to FIG. 7. First, in the operating portion 110 of the image forming apparatus 100, when a "user mode" (not shown) is selected by the user, an "initial screen" shown in part (a) of FIG. 5 is displayed on the operating portion 110. When an "image adjusting mode" of the "initial screen" is selected by the user, the screen is switched to an "adjusting item setting (selecting) screen" shown in part (b) of FIG. 5.

When "ADJUST VARNISH COATING" is selected on the "adjusting item setting screen" by the user, the display (screen) is switched to an "IMAGE DATA SELECTING SCREEN" shown in part (c) of FIG. 5. The user is capable of selecting image data (image file number in this case) from a list of image files shown on the "IMAGE DATA SELECTING SCREEN". After the image data is selected, in response to the operation of a "DTMN (determination)" button by the user, a "TONE IMAGE SELECTING SCREEN" shown in part (d) of FIG. 5 is displayed.

In the "TONER IMAGE SELECTING SCREEN", the toner image formed on the recording material S in one page unit depending on the image data is displayed. The user is capable of changing a page, to be displayed, of the image data by subjecting the operating portion 110 to scroll operation.

As shown in FIG. 6, on the "TONER IMAGE SELECTING SCREEN", not only images (toner images) to be formed on the recording material S are displayed, but also buttons for "CHARACTER", "LINE IMAGE", and "PHOTOGRAPH" as adjusting region selecting buttons are displayed. When each of the buttons for the "CHARACTER", the "LINE IMAGE", and the "PHOTOGRAPH" is operated by the user, for example, for every operation, the toner image selected appropriately changes from the associated toner images. Further, as regards the toner image selected, display different from other (non-selection) toner images is made (for example, the toner image selected is enclosed by a dotted frame). The toner image selected is set as an object to be subjected to the line width adjustment of the varnish image. As regards the varnish image to be overprinted superposedly on the toner image which is thus set as the object, the line width adjustment of the varnish image is carried out on the basis of an adjusting value set on the "line width adjusting screen" shown in FIG. 7.

On the "line width adjusting screen" shown in FIG. 7, the user is capable of determining, by selection of an adjusting portion, whether to make setting of the line width adjusting value (ΔXb) of the portion overlapping with the toner image or setting of the line width adjusting value (ΔXw) of the portion overlapping with the white background portion. Then, as regards the selected one of the line width adjusting value (ΔXb) and the line width adjusting value (ΔXw), the user is capable of changing an adjusting level of " . . . , −2, −1, 0, +1, +2, . . . " by operating "+" or "−" as an adjusting button.

By the operation of the adjusting button "+", the adjusting level is increased, and when the adjusting level is increased, the line width of the varnish image becomes thick. On the other hand, by the operation of the adjusting button "−", the adjusting level is lowered, and when the adjusting level is lowered, the line width of the varnish image becomes narrow (thin). After such an adjusting level is changed, the "DTMN" button is operated, whereby the line width adjusting value (Δxb) and the line width adjusting value (ΔXw) are determined. In the case of this embodiment, the varnish image line width defined in the initial data is increased or decreased with a width (about 0.04 mm) corresponding to 600 dpi, for example, in response to increase or decrease of one level of the line width adjusting value (ΔXb) and the line width adjusting value (ΔXw).

Next, the line width adjustment of the varnish image using the line width adjusting value (ΔXb) and the line width adjusting value (ΔXw) which are described above will be described using part (a) of FIG. 8 to FIG. 10. Part (a) of FIG. 7 is a schematic view showing a varnish image before adjustment, and part (b) of FIG. 8 is a schematic view showing a varnish image after the adjustment. In this embodiment, as the varnish image, a character "F" for which a line width of "0.5 mm" is set as a certain value of the initial data is shown as an example. This varnish image of the character "F" is formed so as to extend over the toner image and the white background portion. Incidentally, the toner image indicated by a solid line is shown as a rectangular solid image as an example.

Part (c) of FIG. 8 is a model diagram for illustrating the line width adjustment of the varnish image on the toner image and the white background portion. In part (c) of FIG. 8, the model diagram shows a difference in line width which can occur, for the varnish image of the above-described character "F", between the toner image and the white background portion. In part (c) of FIG. 8, a portion indicated by a dotted line shows a line width (0.5 mm) of the initial data, and a portion indicated by a solid line shows a line width of the varnish image which is actually formed.

As can be understood from comparison between parts (a) and (b) of FIG. 8, conventionally, as regards the varnish image actually formed on the recording material S, in some cases, the line width of the portion overlapping with the toner image becomes narrower (thinner) than the line width of the initial data, and the line width of the portion overlapping with the white background portion becomes thicker than the line width of the initial data. This can occur due to a contact angle between the recording material S and the toner image (in other words, a toner image thickness), a penetration property of the varnish into the recording material S, surface roughness, and the like. In the case where the varnish image is formed on the recording material S, in actuality, there arises a difference in line width between the portion overlapping with the toner image and the portion overlapping with the white background portion in some instances. For example, the varnish is repelled by a parting agent such as wax contained in the toner image, whereby the varnish image formed on the toner image becomes thinner (narrower) than the varnish image formed on the white background portion where there is no toner image and which is liable to be impregnated with the wax, in some cases.

In this embodiment, in the case where the level of the line width adjusting value (ΔXb) of the portion overlapping with the toner image is increased to the "+" side in the above-described "line width adjusting screen", as indicated by arrows in part (c) of FIG. 8, the line width of the varnish image actually formed expands toward the line width of the initial data on the toner image. On the contrary, in the case where the level of the line width adjusting value (ΔXw) of the portion overlapping with the toner image is decreased to the "−" side in the above-described "line width adjusting screen", as indicated by arrows in part (c) of FIG. 8, the line width of the varnish image actually formed narrows toward the line width of the initial data on the white background portion. That is, if setting of either one or both of the line width adjusting value (ΔXb) and the line width adjusting value (ΔXw) is made, when the varnish image is formed on the recording material S, adjustment of the varnish image line width set by the initial data is performed.

For example, the varnish image line width set at a width of "0.5 mm" by the initial data is adjusted in accordance with the line width adjusting values (ΔXb, ΔXw), whereby the line width of the varnish image actually formed on the recording material S is made close to the same width of "0.5 mm" on the toner image and the white background portion. As can be understood by comparing parts (a) and (b) of FIG. 8 with each other, as regards the varnish image, the portion overlapping with the toner image is positively corrected by the line width adjusting value (ΔXb) and the portion overlapping with the white background portion is negatively corrected by the line width adjusting value (ΔXw), so that the toner image with the same line width is formed on the recording material S.

>Varnish Image Adjusting Processing>

Next, "varnish image adjusting processing" for realizing setting of the line width adjusting values (ΔXb, ΔXw) using the above-described "line width adjusting screen" is shown in FIG. 9. The "varnish image adjusting processing" is started by the main controller 101 (see FIG. 3) with turning-on of a power source of the image forming system 1X, and is repetitively executed until turning-off of the power source.

As shown in FIG. 9, in response to selection of an operation in a "user mode" (not shown) by the user, the main controller 101 causes the operating portion 110 to display the "initial screen" (see part (a) of FIG. 5). Then, when an "image adjusting mode" of the "initial screen" is selected, the main controller 101 switches the display of the operating portion to the "adjusting item selecting screen" (see part (b) of FIG. 5) (S101).

When "varnish image coating adjusting mode" is selected on the "adjusting item selecting screen" by the user, the main controller 101 causes the operating portion 110 to display the "image data selecting screen" (see part (c) of FIG. 5) (S102). At this time, the main controller 101 causes the operating portion 110 to display the "image data selecting screen" on which display items (file 1, file 2, and the like) are edited on the basis of the "varnish image setting information" (see FIG. 4) stored in the RAM 104. Then, when the image data is selected and the "determination" button is operated by the user, the main controller 101 causes the operating portion 110 to display the "toner image selecting screen" (see part (d) of FIG. 5) (S103). In response to an operation of each of the buttons of "character", "line image", and "photograph" by the user, the main controller 101 selects the adjusting item (S104), and when the "line image" button is selected, the main controller 101 causes the operating portion 110 to display the "line width adjusting screen" (see FIG. 7) (S105).

The main controller 101 discriminates whether or not the line width adjusting value (ΔXb) of the portion overlapping with the toner image and the line width adjusting value (ΔXw) of the portion overlapping with the white background portion are changed and then the "determination" button is operated by the user (S106). In the case where the line width adjusting value (ΔXb) and the line width adjusting value (ΔXw) are changed and then the "determination" button is operated (Yes of S106), the main controller 101 updates the varnish image line width of the "varnish image setting information" (FIG. 4) stored in the RAM 104 (S107).

<Varnish Image Preparing Processing>

Next, the "varnish image preparing processing" for realizing the varnish image line width adjustment using the line width adjusting value (ΔXb) and the line width adjusting value (ΔXw) which are described above is shown in FIG. 10. The "varnish image preparing processing" is started by the main controller 101 with input of a start of the operation in the "image forming mode".

The main controller 101 not only reads, from the RAM 104, the image data instructed with the input of the start of the operation in the "image forming mode", but also reads the corresponding "varnish image setting information" (see FIG. 4) from the RAM 104 on the basis of the kind of the recording material S, for example (S201). As regards the instructed image data, the main controller 101 discriminate discriminates whether or not the varnish image is formed on the recording material S in accordance with the "varnish image setting" of the "varnish image setting information" (S202).

In the case where the varnish image is not formed (No of S202), the main controller 101 selects the operation in a normal print mode for forming the toner image on the recording material S on the basis of data relating to the toner image of the image data (S203). In addition thereto, the main controller sends, to the varnish coater 200 (specifically the varnish processing controller 330), that the varnish image is not formed (S204). Thereafter, the main controller 101 causes the image forming apparatus 100 to operate, so that the toner image is formed on the recording material S (S206). In this case, the varnish coater 200 does not form the varnish image on the recording material S on which the toner image is formed by the image forming apparatus 100.

In the case where the varnish image is formed (Yes of S202), the main controller 101 sends, to the varnish coater 200, the "varnish image setting information" of the corresponding image data read from the RAM 104 together with the data (initial data) relating to the varnish image of the image data (S205). Thereafter, the main controller 101 causes the image forming apparatus 100 to operate, so that the toner image is formed on the recording material S (S206). In this case, the varnish coater 200 forms the varnish image on the recording material S on which the toner image is formed by the image forming apparatus 100. The varnish coater 200 (specifically the varnish processing controller 330) forms the varnish image on the recording material S on the basis of the initial data sent by the main controller 101. However, in the case where the varnish image extending over the toner image and the white background portion is formed, the varnish processing controller 330 changes the varnish image line width on the basis of the line width initial value (Ws), the line width adjusting value (ΔXb) of the portion overlapping with the toner image, and the line width adjusting value (ΔXw) of the portion overlapping with the white background portion of the "varnish image setting information".

As described above, in this embodiment, in the case where the varnish image extending over the toner image and the white background portion is formed, the varnish image line width (line width initial value (Ws)) is changed by the line width adjusting value (ΔXb) of the portion overlapping with the toner image and the line width adjusting value (ΔXw) of the portion overlapping with the white background portion background portion. Further, setting of the line width adjusting value (ΔXb) of the portion overlapping with the toner image and the line width adjusting value (ΔXw) of the portion overlapping with the white background portion is enabled. By setting the line width adjusting value (ΔXb) of the portion overlapping with the toner image and the line width adjusting value (ΔXw) of the portion overlapping with the white background portion, the user is capable of making the line width of the varnish image actually formed on the recording material S close to the line width of the varnish image set as the initial data. Thus, in the case where the varnish image is formed so as to extend over the toner image and the white background portion, it is possible to suppress that a difference in line width occurs between the toner image and the white background portion as a boundary.

Second Embodiment

In the above-described first embodiment, as shown in part (c) of FIG. 8, the line width adjustment of the varnish image was described by taking, as an example, the case where the line width of the portion overlapping with the toner image becomes narrower (thinner) than the line width of the initial data and where the line width of the portion overlapping with the white background portion becomes broader (thicker) than the line width of the initial data. However, for example, when a resin film is used as the recording material S, as shown in FIG. 11, in some cases, the line width of the portion overlapping with the toner image became broader (thicker) than the line width of the initial data and the line width of the portion overlapping with the white background portion became narrower (thinner) than the line width of the initial data. This would be considered because the varnish is repelled by a surface property of the resin film and thus the varnish image formed on the white background portion becomes narrower than the varnish image formed on the toner image.

Also, in this case, by performing the adjustment of the varnish image line width on the basis of the adjusting value set on the "line width adjusting screen" shown in FIG. 7, the line width of the varnish image actually formed on the recording material S can be made close to the line width of the varnish image set as the initial data. Thus, in the case where the varnish image is formed so as to extend over the toner image and the white background portion, it is possible to suppress that a difference in line width occurs between the toner image and the white background portion as a boundary.

Third Embodiment

In the first embodiment and the second embodiment, the constitution in which the line width of the portion overlapping with the toner image and the line width of the portion overlapping with the white background portion was described, but by adjusting the line width, in some cases, there arose a difference in thickness between the varnish image on the toner image and the varnish image on the white background portion. In this case, a stepped portion was formed between the varnish image on the toner image and the varnish image on the white background portion, so that there was a liability that a difference in appearance was caused to occur between the varnish images.

Therefore, in a third embodiment, the adjustment of the varnish image line width is enabled by using a film thickness adjusting value of the varnish image in addition to the above-described line width adjusting values (ΔXb, ΔXw). In the following, the third embodiment will be described, but a difference from the above-described first embodiment will be principally described, and the constitution which is the same as the constitution of the first embodiment will be briefly described or omitted from the description.

In the case of the third embodiment, as shown in FIG. 4, as regards the "varnish image setting information", as film thickness adjusting values of the varnish image, a film thickness initial value (initial film thickness value) (Ds), a film thickness adjusting value (ΔXd) of a portion overlapping with the toner image, and a film thickness adjusting value (ΔXv) of the portion overlapping with the white background portion are stored. The film thickness adjusting value (Ds) is updated by a film thickness value of the varnish image defined in the initial data.

The above-described film thickness adjusting values XX (ΔXd, ΔXv) are updated by an operation of a "film thickness adjusting screen" (FIG. 12) described later. The film thickness of the varnish image formed by the varnish coater 200 is determined by the following formulas 3 and 4.

(Film thickness of portion overlapping with toner image)=(film thickness initial value($Ds$))+(line width adjusting value($\Delta Xd$)) formula 3

(Film thickness of portion overlapping with varnish image)=(film thickness initial value ($Ds$))+(line width adjusting value($\Delta Xw$)) formula 4

Setting of the above-described film thickness adjusting value (ΔXd) of the portion overlapping with the toner image and the above-described film thickness adjusting value (ΔXv) of the portion overlapping with the varnish image will be described using FIG. 12. On the "film thickness adjusting screen" shown in a lower stage of FIG. 12, the user is capable of determining, by selection of an adjusting portion, whether to make setting of the film thickness adjusting value (ΔXd) of the portion overlapping with the toner image or setting of the film thickness adjusting value (ΔXv) of the portion overlapping with the white background portion. As regards the selected one of the film thickness adjusting value (ΔXd) and the film thickness adjusting value (ΔXv), the user is capable of increasing or decreasing a set value with a step width of "5 μm" by operating "+" or "−" as an adjusting button.

By the operation of the adjusting button "+", the film thickness becomes thick and by the operation of the adjusting button "−", the film thickness becomes thin. Incidentally, as shown in FIG. 12, by displaying the "line width adjusting screen" together with the "film thickness adjusting screen", the line width adjusting values (ΔXb, ΔXw) may also be made settable.

In the case where the level of the film thickness adjusting value (ΔXd) of the portion overlapping with the toner image is lowered to the "−" side in the above-described "film thickness adjusting screen", a varnish application amount is decreased and therefore, as indicated by arrows in FIG. 11, the line width of the varnish image actually formed narrows toward the line width of the initial data on the toner image. On the contrary, in the case where the level of the film thickness adjusting value (ΔXv) of the portion overlapping with the toner image is increased to the "+" side in the above-described "film thickness adjusting screen", the varnish application amount is increased and therefore, as indicated by arrows in FIG. 11, the line width of the varnish image actually formed expands toward the line width of the initial data on the white background portion. That is, setting of either one or both of the film thickness adjusting value (ΔXd) and the film thickness adjusting value (ΔXv) is made, and the varnish image is formed on the recording material S so that the varnish image line width is close to the varnish image line width set by the initial data. For example, when the varnish image set at a width of "0.5 mm" by the initial data is formed, in accordance with the film thickness adjusting values (ΔXd, ΔXv), the varnish application amount is adjusted, so that the line width of the varnish image actually formed on the recording material S becomes the same width of "0.5 mm" on the toner image and the white background portion.

As described above, in this embodiment, setting of the film thickness adjusting value (ΔXd) of the portion overlapping with the toner image and the film thickness adjusting value (ΔXv) of the portion overlapping with the white background portion was enabled. By setting the film thickness adjusting value (ΔXd) of the portion overlapping with the toner image and the film thickness adjusting value (ΔXv) of the portion overlapping with the white background portion, the user is capable of making the line width of the varnish image actually formed on the recording material S close to the line width of the varnish image set as the initial data. Thus, in the case where the varnish image is formed so as to extend over the toner image and the white background portion, it is possible to suppress that a difference in line width occurs between the toner image and the white background portion as a boundary.

Fourth Embodiment

In the above-described first to third embodiments, the toner image desired by the user and the varnish image are actually outputted on the recording material S, and whether or not the difference in line width of the varnish image occurs between the toner image and the white background portion at the boundary can be checked by the user by (eye) observation. Therefore, until the user confirms a desired result, the user caused to the image forming apparatus to output a number of sheets of recording materials S while appropriately changing the setting of the line width adjusting values (ΔXb, ΔXw) and the film thickness adjusting values (ΔXd, ΔXv) which are described above. However, in such a case, it takes much time for determining the line width adjusting values (ΔXb, ΔXw) and the film thickness adjusting values (ΔXd, ΔXv), and there is a liability that the recording material S is consumed uselessly.

Therefore, in a fourth embodiment, a test chart is outputted in order that the user checks whether or not the difference in line width of the varnish image occurs between the toner image and the white background portion as the boundary and that setting of the line width adjusting values (ΔXb, ΔXw) and the film thickness adjusting values (ΔXd, ΔXv) can be efficiently performed. In the following, the fourth embodiment in which the test chart is outputted will be described.

FIG. 13 shows an example of a "test mode screen" for outputting the test chart. The "test mode screen" is displayed at the operating portion 110, and the user is capable of setting various conditions relating to the test chart through the "test mode screen".

A "sheet setting" button is a button for selecting the cassette 10 (see FIG. 1) in which recording materials S subjected to varnish image adjustment are accommodated. The user accommodates the recording materials intended to be subjected to the varnish image adjustment in a desired cassette 10, and then selects the cassette 10 in which the recording materials S are accommodated by operating the "sheet setting" button. In this embodiment, a "cassette 1" is selected, and the recording material S is supplied for the test chart from the cassette 1. A "line width center set value (reference line width value)" button is a button for setting a reference line width value of a test varnish image outputted on the test chart. The user is capable of setting the reference line width value in a range of "0.1 mm to 5 mm", for example. A "film thickness center set value (reference film thickness value)" button is a button for setting a reference film thickness value of a test varnish image outputted on the test chart. The user is capable of setting the reference film thickness value in a range of "5 μm to 50 μm", for example. As described later specifically, on the test chart, a plurality of test varnish images are formed on the basis of the reference line width value and the reference film thickness values, which are set as the center set values. Incidentally, each of the reference line width value and the reference film thickness value is set for each of the portion overlapping with the toner image and the portion overlapping with the white background portion. Here, the line width center set value is the initial value Ws shown in FIG. 4. Further, the film thickness center set value is the initial value Ds shown in FIG. 4. On a screen shown in FIG. 13, values indicated in FIG. 4 may be displayed as the initial values Ws and Ds. Further, the line width center set value and the film thickness center set value which are set on the screen of FIG. 13 may be stored as the initial values Ws and Ds, respectively. A "determination" button is a button for finally determining the above-described center set value. A "test image printing" button is a button for starting execution of an operation in a "test chart output mode". In response to operation of the "test image printing" button, the operation in the test chart output mode (not shown) is executed by the main controller 101, so that two kinds of test charts shown in FIGS. 14 and 15 are successively outputted.

The test chart will be described using the FIGS. 14 and 15. As shown in FIGS. 14 and 15, test toner images (first test toner image, second test toner image) different in color (YMCK) are formed side by side as test images on a single recording material S. The test toner images are, for example, solid images which are formed in a rectangular shape with the same size.

In an upper stage (portion) of the test chart, "Y, M, C, K" indicating the colors of the toner images are printed in association with the test toner images formed side by side. Further, single color test toner images for each of YMCK are vertically formed and arranged so as to sandwich the white background portion as indicated by a broken line (the first test toner image, a third test toner image). Rectilinear test varnish images (first test varnish image, second test varnish image) are formed so as to extend over the test toner image and the white background portion. In this embodiment, five test varnish images are formed on a single test toner image (and the white background portion).

In the upper stage (portion) of the test chart, in addition to the "Y, M, C, K" indicating the above-described colors, line width adjusting levels of "−2, −1, 0, +1, +2" of the above-described varnish images are printed in association with the five test varnish images. Further, on a left-hand side of the test chart, "+10, +5, center set value, −5, −10" indicating the film thicknesses of the test varnish images are printed in association with the test toner images vertically arranged.

In the case of the test chart shown in FIG. 14, in the white background portion, all the test varnish images are formed in the same film thickness (for example, 10 μm) set by the "film thickness center set value" (see FIG. 13) on the above-described "test mode screen". In addition, in the white background portion, all the test varnish images are formed in the same line width (for example, 0.5 mm) set by the "line width center set value" (see FIG. 13) on the above-described "test mode screen".

On the other hand, on each of the test toner images, for each of color units, the test varnish images are formed in five different film thicknesses (+10, +5, center set value (μm), −5, −10). Further, for each (single) test toner image, the test varnish images are formed with five different line widths (adjusting levels: −2, −1, 0, +1, +2). The adjusting level of "0" shows that a set value set by the "line width center set value" (see FIG. 13) on the above-described "test mode screen" is indicated as a "0" basis.

Thus, on each of the test toner images, the plurality of test varnish images are formed in accordance with combinations of different line widths and different film thicknesses. In accordance with these combinations of the five line widths (adjusting level: −2, −1, 0, +1, +2) and the five film thicknesses (+10, +5, center set value, −5, −10), on each of the test toner images for (Y, M, C, K), 25 pieces (combinations of 5×5) of the test varnish images are formed. The user looks at the test chart shown in FIG. 14, and is capable of comparing the line widths of the test varnish images formed on the test toner images for the respective colors (Y, M, C, K) on the basis of the line widths of the test varnish images formed on the white background portion with the same width.

On the other hand, in the case of the test chart shown in FIG. 15, on each test toner image, all the test varnish images are formed in the same film thickness (for example, 10 μm) set by the "film thickness center set value" (see FIG. 13) on the above-described "test mode screen". In addition, on each test toner image, all the test varnish images are formed in the same line width (for example, 0.5 mm) set by the "line width center set value" (see FIG. 13) on the above-described "test mode screen".

On the other hand, in the white background portion corresponding to each of the test toner images, for each of color units, the test varnish images are formed in five different film thicknesses (+10, +5, center set value (μm), −5, −10). Further, for each (single) white background portion, the test varnish images are formed with five different line widths (adjusting levels: −2, −1, 0, +1, +2).

Thus, on each white background portion, the test varnish images are formed in accordance with the plurality of combinations of different line widths and different film thicknesses. In accordance with these combinations of the five line widths (adjusting level: −2, −1, 0, +1, +2) and the five film thicknesses (+10, +5, center set value, −5, −10), on each of the white background portions corresponding to the test toner images for (Y, M, C, K), 25 pieces (combinations of 5×5) of the test varnish images are formed. The user looks at the test chart shown in FIG. 15, and is capable of comparing the line widths of the test varnish images formed on the white background portions for the respective colors (Y, M, C. K) on the basis of the line widths of the test varnish images formed on the test toner images with the same width.

The user looks at the above-described two kinds of test charts, and is capable of easily setting the line width adjusting values (ΔXb. ΔXw) and the film thickness adjusting values (ΔXd, ΔXv) which are capable of suppressing the occurrence of the difference in line width of the varnish image as shown in part (c) of FIG. 8 and FIG. 11. By outputting the test charts, the user does not take time for determining the line width adjusting values (ΔXb, ΔXw) and the film thickness adjusting values (ΔXd, ΔXv), and the recording material S is not consumed uselessly.

Incidentally, the line width and the film thickness of the test varnish image formed on the test chart are not limited to the above-described numerical values, but may appropriately be changed depending on constitutions of the image forming apparatus 100 and the varnish coater 200, and conditions of the toner image desired by the user and the varnish image.

According to the present invention, in the constitution in which the varnish image is capable of being overprinted on the toner image on the recording material, in the case where the varnish image is formed so as to extend over the toner image and the white background portion, it becomes possible to easily suppress the occurrence of the difference in line width of the varnish image between the toner image and the white background portion as the boundary.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2021-143044 filed on Sep. 2, 2021, and 2022-111491 filed on Jul. 12, 2022, which are hereby incorporated by reference herein in their entirety.

What is claimed is:

1. An image forming system comprising:

an image forming unit configured to form a toner image on a recording material; and a varnish applying unit configured to form a varnish image by ejecting varnish onto the recording material, wherein the image forming unit forms at least one test toner image on the recording material, wherein the varnish applying unit forms a first test varnish image overlapping with an image portion where the test toner image is formed and a non-image portion where the test toner image is not formed, and a second test varnish image overlapping with the image portion and the non-image portion, and wherein the first test varnish image and the second test varnish image are different in line width.

2. The image forming system according to claim 1, further comprising an input unit configured to permit input of a line width adjusting value of either one of a line width of a portion of the varnish image overlapping with the image portion and a line width of a portion of the varnish image overlapping with the non-image portion, wherein the varnish image is formed so as to extend over the image portion where the toner image is formed on the recording material and the non-image portion where the toner image is not formed on the recording material.

3. The image forming system according to claim 2, wherein said input unit includes a display portion that displays the line width adjusting value and a setting portion that sets the line width adjusting value.

4. The image forming system according to claim 2, wherein said input unit includes a display portion that displays toner images formed on the recording material on the basis of image data, and a selecting portion that selects the toner image, of the toner images displayed on said display portion, for which the line width of the varnish image is corrected in accordance with the line width adjusting value.

5. The image forming system according to claim 1, further comprising an input unit configured to permit input of a film thickness adjusting value of either one of a film thickness of a portion of the varnish image overlapping with the image portion and a film thickness of a portion of the varnish image overlapping with the non-image portion, wherein the varnish image is formed so as to extend over the image portion where the toner image is formed on the recording material and the non-image portion where the toner image is not formed on the recording material.

6. The image forming system according to claim 5, wherein said input unit includes a display portion that displays the film thickness adjusting value and a setting portion that sets the film thickness adjusting value.

7. The image forming system according to claim 5, wherein said input unit includes a display portion that displays toner images formed on the recording material on the basis of image data, and a selecting portion that selects the toner image, of the toner images displayed on said display portion, for which the film thickness of the varnish image is corrected in accordance with the film thickness adjusting value.

8. The image forming system according to claim 1, wherein the test toner image includes images formed in the same size and in a rectangular shape, and wherein the first test varnish image and the second test varnish image are images formed linearly.

9. The image forming system according to claim 1, wherein said image forming unit forms a first test toner image and a second test toner image different in color and causes said varnish applying unit to form the first test varnish image and the second test varnish image in the same film thickness on the first test toner image and the second test toner image.

10. The image forming system according to claim 1, further comprising an input unit configured to permit input of either one of a line width reference value of the portion of the varnish image overlapping with the image portion or a line width reference value of the portion of the varnish image overlapping with the non-image portion, wherein said varnish applying unit forms the first test varnish image and the second test varnish image depending on the line width reference value inputted by said input unit.

11. The image forming system according to claim 1, further comprising an input unit configured to permit input of either one of a film thickness reference value of the portion of the varnish image overlapping with the image portion and a film thickness reference value of the portion of the varnish image overlapping with the non-image portion, and wherein said image forming unit forms first, second, and third test toner images, with the third test toner image having the same color as the color of the first test toner image and said varnish applying unit forms the first test varnish image and the second test varnish image, which are each changed in film thickness depending on the film thickness reference value inputted by said input portion, on the first test toner image and the third test toner image.

12. The image forming system according to claim 1, wherein the varnish is an ultraviolet-curable varnish, and wherein said varnish applying unit includes an ejecting portion that ejects the varnish onto the recording material, and an ultraviolet irradiation portion that irradiates the varnish with ultraviolet radiation.

13. An image forming system comprising:

an image forming unit configured to form a toner image on a recording material; and a varnish applying unit configured to form a varnish image by ejecting varnish onto the recording material, wherein the varnish applying unit forms a first test varnish image overlapping with an image portion where the test toner image is formed and a non-image portion where the test toner image is not formed, and a second test varnish image overlapping with the image portion and the non-image portion, and wherein the first test varnish image and the second test varnish image are different in film thickness.

14. The image forming system according to claim 13, further comprising an input unit configured to permit input of a line width adjusting value of either one of a line width of a portion of the varnish image overlapping with the image portion and a line width of a portion of the varnish image overlapping with the non-image portion, wherein the varnish image is formed so as to extend over the image portion where the toner image is formed on the recording material and the non-image portion where the toner image is not formed on the recording material.

15. The image forming system according to claim 14, wherein said input unit includes a display portion that displays the line width adjusting value and a setting portion that sets the line width adjusting value.

16. The image forming system according to claim 14, wherein said input unit includes a display portion that displays toner images formed on the recording material on the basis of image data, and a selecting portion that selects the toner image, of the toner images displayed on said display portion, for which a line width of the varnish image is corrected in accordance with the line width adjusting value.

17. The image forming system according to claim 13, further comprising an input unit configured to permit input of a film thickness adjusting value of either one of a film thickness of a portion of the varnish image overlapping with the image portion and a film thickness of a portion of the varnish image overlapping with the non-image portion, wherein the varnish image is formed so as to extend over the image portion where the toner image is formed on the recording material and the non-image portion where the toner image is not formed on the recording material.

18. The image forming system according to claim 17, wherein said input unit includes a display portion that displays the film thickness adjusting value and a setting portion that sets the film thickness adjusting value.

19. The image forming system according to claim 17, wherein said input unit includes a display portion that displays toner images formed on the recording material on the basis of image data, and a selecting portion that selects the toner image, of the toner images displayed on said display portion, for which a film thickness of the varnish image is corrected in accordance with the film thickness adjusting value.

20. The image forming system according to claim 13, wherein the test toner image includes images formed in the same size and in a rectangular shape, and wherein the first test varnish image and the second test varnish image are images formed linearly.

21. The image forming system according to claim 13, wherein said image forming unit forms a first test toner image and a second test toner image different in color and causes said varnish applying unit to form the first test varnish image and the second test varnish image in the same line width on the first test toner image and the second test toner image.

22. The image forming system according to claim 13, further comprising an input unit configured to permit input of either one of a line width reference value of the portion of the varnish image overlapping with the image portion or a line width reference value of the portion of the varnish image overlapping with the non-image portion, wherein said varnish applying unit forms the first test varnish image and the second test varnish image depending on the line width reference value inputted by said input unit.

23. The image forming system according to claim 13, further comprising an input unit configured to permit input of either one of a film thickness reference value of the portion of the varnish image overlapping with the image portion and a film thickness reference value of the portion of the varnish image overlapping with the non-image portion, and wherein said image forming unit forms first, second, and third test toner images, with the third test toner image having the same color as the color of the first test toner image and said varnish applying unit forms the first test varnish image and the second test varnish image, which are each changed in film thickness depending on the film thickness reference value inputted by said input portion, on the first test toner image and the third test toner image.

24. The image forming system according to claim 13, wherein the varnish is an ultraviolet-curable varnish, and wherein said varnish applying unit includes an ejecting portion that ejects the varnish onto the recording material, and an ultraviolet irradiation portion that irradiates the varnish with ultraviolet radiation.

* * * * *